No. 676,252. Patented June 11, 1901.
J. HESTER.
CANE STRIPPER.
(Application filed Feb. 4, 1901.)
(No Model.)
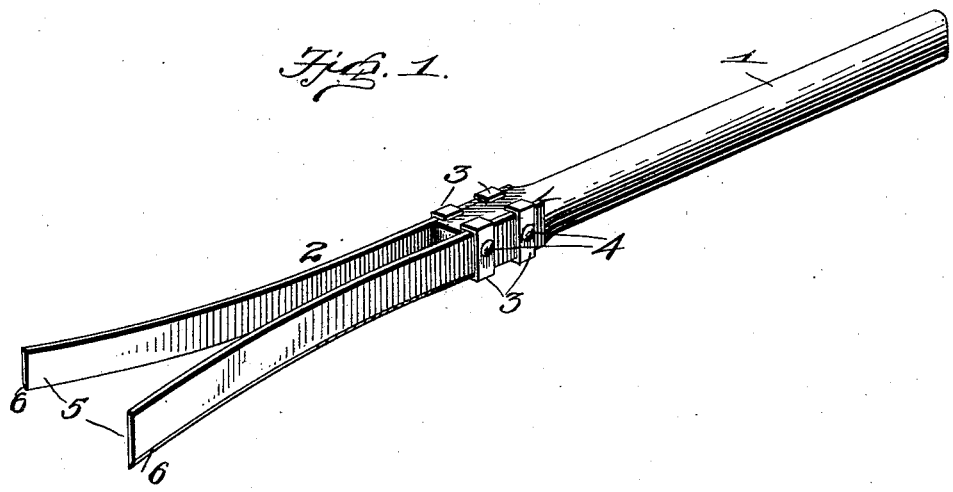
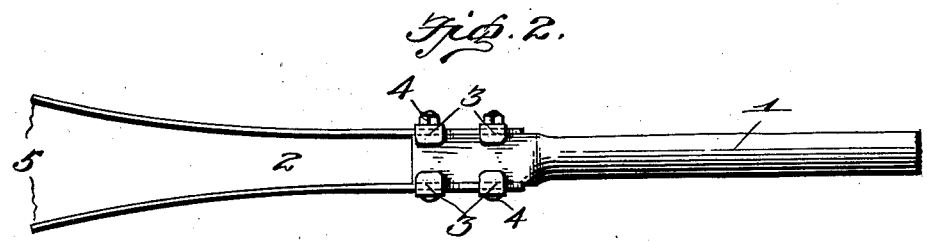
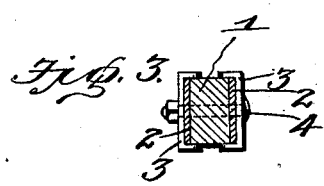
Witnesses
Inventor
John Hester,
By H. B. Willson & Co.
Attorneys

UNITED STATES PATENT OFFICE.

JOHN HESTER, OF COLQUITT COUNTY, GEORGIA.

CANE-STRIPPER.

SPECIFICATION forming part of Letters Patent No. 676,252, dated June 11, 1901.

Application filed February 4, 1901. Serial No. 45,999. (No model.)

*To all whom it may concern:*

Be it known that I, JOHN HESTER, a citizen of the United States, residing in the county of Colquitt, in the State of Georgia, have invented certain new and useful Improvements in Cane-Strippers; and I do declare the following to be a full, clear, and exact description of the invention, such as will enable others skilled in the art to which it appertains to make and use the same.

This invention relates to a cane-stripper or a device for stripping the stalks or stocks of sugar-cane of the shoots or leaves which grow thereon to put the cane in condition for grinding.

The object of the invention is to provide a simple, cheap, and effective device of this character by means of which the operation of stripping the cane may be easily and expeditiously performed and time and labor saved.

The invention consists of a cane-stripper embodying certain novel features of construction and combination of parts which will be hereinafter more fully described, and particularly pointed out in the appended claim.

In the accompanying drawings, Figure 1 is a perspective view of a cane-stripper embodying my invention. Fig. 2 is a top plan view thereof. Fig. 3 is a cross-section through the handle, showing the fastenings.

Referring now more particularly to the drawings, the numeral 1 represents the handle of the device, which may be of any preferred form, size, and material, and 2 represents the stripping-blades thereof, which project from one end of the handle. These blades—two in number—are disposed one opposite the other and are secured at their inner ends to opposite sides of the handle by clips 3 and securing-bolts 4. In constructing the blades 2 I preferably form them of thin flexible spring-steel, so as to be capable of yielding readily under pressure to accommodate themselves to the size of the cane-stock and to assume their normal positions by their own resiliency. From their point of attachment to the handle it will be noted the blades extend straight and parallel for a short distance and then gradually flare outwardly or diverge and at their outer or free ends 5 have a pronounced outward flare or divergence, the purpose of which will be hereinafter explained. Each blade has a lower longitudinal cutting edge 6 extending its entire length.

In using the device the handle 1 is held in the hand of the operator and the flared ends 5 of the blades placed upon opposite sides of the stalk or stock of the cane, so as to admit said stock between them. The handle is then thrust forward until the stalk is disposed the proper distance in rear of the said flared ends 5 of the blades, and then the device is moved downwardly along the stalk to strip or cut away the shoots or leaves therefrom at a single operation. The object of flaring the outer ends of the blades and making said blades of flexible spring-steel is to adapt the same to freely admit stalks of different sizes between them and conform to irregularities of surface on the downward movement of the device, while at the same time maintaining a gentle bearing or pressure on the opposite sides of the stalk to insure the clean removal of the shoots or leaves, also to prevent the blades from cutting into the stalk where irregularities of surface are encountered.

As is well known, the stalks of sugar-cane are tapering, being smallest at the top and gradually increasing in size to the bottom, so that it will be readily understood that the use of blades of this character is of great advantage in preventing injury to the stalk and securing the clean removal of all offshoots at one stroke of the stripper. In the use of my invention the blades readily yield to accommodate themselves to the tapering form of the stalk to closely engage the same at all points, so that one stroke of the stripper downward serves to cleanly remove all offgrowths, leaving the cane stripped bare and smooth and in perfect condition for grinding. It will be noted also that the blades are free from bows or offsets and from connection with each other throughout their entire length, whereby the construction is made much simpler than prior devices of the kind, and the blades are adapted to receive the cane-stalk between them at any point between their outer ends and the handle and to cut at any point along their length, thereby obviating the necessity of springing the blades apart to admit the stalk and doing away with the objectionable feature of limiting the cutting edges to any particular position. Furthermore, by arranging the blades so as to enable me to employ cutting edges extending the entire length of the projecting surfaces of said blades and giving the blades the curvature described the device may be used for stripping the tapered stalk without the necessity of springing the blades apart at any point along the stalk by simply bringing the upper thin extremity of the stalk between the blades near the handle and then gradually drawing the knife rearwardly on its downstroke, so as to bring the stalk nearer to the flared ends 5 as the thickness of the stalk increases. By this mode of operation all liability of cutting into the body of the stalk will be prevented.

From the foregoing description, taken in connection with the accompanying drawings, the construction, mode of operation, and advantages of my invention will be readily understood, and it will be seen that a simple and efficient tool is provided.

While the preferred embodiment of the invention is as herein disclosed, it will of course be understood that changes in the form, proportion, and minor details of construction may be made within the scope of the invention without departing from the spirit or sacrificing any of the advantages thereof.

Having thus described my invention, what I claim as new, and desire to secure by Letters Patent, is—

A cane-stripper comprising a handle provided with flexible spring-metal stripping-blades projecting outwardly therefrom, said blades being free from bows or offsets and from contact with each other and extending a short distance from the handle substantially in parallel relation, thence having a gradual outward flare or divergence to a point adjacent to their outer ends, and finally having a pronounced flare or divergence at said outer ends, said blades also having cutting edges, substantially throughout their entire length, substantially as set forth.

In testimony whereof I have hereunto set my hand in presence of two subscribing witnesses.

JOHN HESTER.

Witnesses:
W. C. HESTER,
S. G. GREGORY.